US007797080B2

(12) United States Patent
Durham, III

(10) Patent No.: US 7,797,080 B2
(45) Date of Patent: Sep. 14, 2010

(54) OPTO-PROGRAMMED HVAC CONTROLLER

(75) Inventor: Ormonde G. Durham, III, Jordanville, NY (US)

(73) Assignee: OGD V-HVAC Inc., Van Hornsville, NY (US)

( * ) Notice: Subject to any disclaimer, the term of this patent is extended or adjusted under 35 U.S.C. 154(b) by 420 days.

(21) Appl. No.: 10/867,404

(22) Filed: Jun. 14, 2004

(65) Prior Publication Data

US 2005/0278071 A1    Dec. 15, 2005

(51) Int. Cl.
G05B 13/00    (2006.01)
(52) U.S. Cl. ..................... 700/278; 700/276
(58) Field of Classification Search ............ 700/276, 700/278; 236/67, 74; 388/934
See application file for complete search history.

(56) References Cited

U.S. PATENT DOCUMENTS

| | | | |
|---|---|---|---|
| 4,353,409 A | 10/1982 | Sauders et al. | 165/240 |
| 4,422,571 A | 12/1983 | Bowman | 236/49.3 |
| 4,438,376 A | 3/1984 | Varnovitsky | 318/78 |
| 4,638,233 A | 1/1987 | Erdman | 318/644 |
| 4,667,480 A | 5/1987 | Bessler | 62/180 |
| 4,763,347 A | 8/1988 | Erdman | 318/400.22 |
| 4,806,833 A | 2/1989 | Young | 318/400.08 |
| 5,177,393 A | 1/1993 | Webber | 310/68 |
| 5,410,230 A | 4/1995 | Bessler et al. | 318/471 |
| 5,423,192 A | 6/1995 | Young et al. | 62/228.4 |
| 5,448,141 A * | 9/1995 | Kelley et al. | 318/400.35 |
| 5,491,978 A | 2/1996 | Young et al. | 62/126 |
| 5,492,273 A * | 2/1996 | Shah | 236/44 A |
| 5,592,059 A | 1/1997 | Archer | 318/400.08 |
| 5,665,965 A * | 9/1997 | Durham, III | 250/231.13 |
| 6,062,482 A | 5/2000 | Gauthier et al. | 236/11 |
| 6,070,660 A | 6/2000 | Brynes et al. | 165/244 |
| 6,087,654 A * | 7/2000 | Durham, III | 250/231.13 |

(Continued)

FOREIGN PATENT DOCUMENTS

EP    0 638 981    2/1995

(Continued)

OTHER PUBLICATIONS

European Search Report dated Apr. 30, 2009.

(Continued)

*Primary Examiner*—Ryan A Jarrett
(74) *Attorney, Agent, or Firm*—Ostrolenk Faber LLP

(57) ABSTRACT

A Heating, Ventilating, and Air Conditioning (HVAC) Management and Control System (CS) that provides "Closed Loop Adaptive Climate Control" of heating, cooling, ventilation or any combination thereof to an occupied space using standard AC electric induction motor(s) connected to a fan and other motor or electric powered devices. This new CS uses methods and apparatus based on Opto-Programming & Processing (OP) Analog techniques that allow multi-dimensional concurrent variables to continuously and Adaptively vary the quantity and/or rate of discharge air, return air, outside air (where available), discharge air temperature and thermal (heat/cool) fluid flow. This new CS adapts, adjusts, varies electric motor(s) and device(s), speeds and actions by concurrently adjusting motor voltage, frequency and phase as needed; to control fan output(s), associated damper actuators, valve actuators, or other unit devices. The new CS is capable of accepting or generating multiple inputs, outputs, or a combination of both from sensors, devices, motors and more in analog or digital format.

32 Claims, 7 Drawing Sheets

U.S. PATENT DOCUMENTS

| | | | |
|---|---|---|---|
| 6,278,909 B1 | 8/2001 | Thibeault et al. | 700/286 |
| 6,684,944 B1 | 2/2004 | Brynes et al. | 165/247 |
| 6,695,046 B1 | 2/2004 | Byrnes et al. | 165/247 |
| 7,204,429 B2 | 4/2007 | Olney | 236/49.3 |
| 2005/0056799 A1* | 3/2005 | Malone | 251/11 |

FOREIGN PATENT DOCUMENTS

| | | |
|---|---|---|
| EP | 1 122 104 A2 | 8/2001 |
| GB | 2 232 784 | 12/1990 |
| GB | 2 318 431 | 4/1998 |
| JP | 3-17467 | 1/1991 |
| JP | 7-79595 | 3/1995 |
| JP | 11-511852 | 10/1999 |
| JP | 2000-304335 | 11/2000 |
| JP | 2001-280135 | 10/2001 |
| JP | 2001-354029 | 12/2001 |
| JP | 2002-209396 | 7/2002 |
| JP | 2003-523873 | 8/2003 |
| WO | 96/27118 | 9/1996 |
| WO | WO 01/62529 A1 | 8/2001 |
| WO | WO 2004/068614 | 8/2004 |

OTHER PUBLICATIONS

Y. Liu, "Improved Design of Switched Reluctance Motor Drives", *Dissertation for Clarkson University*, pp. i-107 (1999).

"Unit Ventilator VSD Energy Analysis", *Opto Generic Devices V-HVAC, Inc.*, pp. 1-5 (2004).

"Home Energy Magazine Online Jul./Aug. 1997", *Home Energy*, May 3, 2009, <http://www.homeenergy.org/archive/hem.dis.anl.gov/eehem/97/970717.html>.

P. Pillay et al., "A Novel Switched Reluctance Motor Drive with Optical Graphical Programming Technology", *IEEE Transactions on Industrial Electronics*, 47(4):915-919 (2000).

"Inventions & Innovation Project Fact Sheet: Simple Control for Single-Phase AC Induction Motors in HVAC Systems", *U.S. Department of Energy*, (2001).

"The New Encoder "*OP Drive*" : Structure . . . Size . . . Attach = 1$^{st}$ Key! . . . Simple, Small..but Robust! Drwg: OP1", *Opto Generic Devices Inc: Optical Programming*, p. 11 (2001).

"OPE Inside Technology—a Motion Processing Unit (MPU) = 2$^{nd}$ Key! Drwg: OP2", *Opto Generic Devices Inc: Optical Programming*, p. 12 (2001).

"An AC Motor with OGD's GPE Drive: Concept, Connect & Construction "Internal Photonics Motion Processing Unit (MPU)" Drwg: OP3", *Opto Generic Devices Inc: Optical Programming*, p. 13 (2001).

"An SR Motor with OGD's GPE Drive: Concept, Connect & Construction "Internal Photonics Motion Processing Unit (MPU)" Drwg: OP4", *Opto Generic Devices Inc: Optical Programming*, p. 14 (2001).

"Option to Drive a Typical AC or DC Motor Application Using: An OPE Drwg: OP5", *Opto Generic Devices Inc: Optical Programming*, p. 15 (2001).

"OGD's AAS™ Closed Loop Motor Fan Control vs. Competing closed loop (and/or sensor-less) Motor Fan control Drwg: OP7", *Opto Generic Devices Inc: Optical Programming*, p. 17 (2001).

"Input "Data" [= cyclic motion (+s)] Drwg: OP7A", *Opto Generic Devices Inc: Optical Programming*, p. 18 (2001).

"Example of Driving a Non-Linear Compressor Load Using: A Generic OPE; Shaping the Electrical Waveform Where: Motor Shaft Speeds Match the Mechanical Load Drwg: OP8", *Opto Generic Devices Inc: Optical Programming*, p. 19 (2001).

"Example of Driving a Non-Linear Compressor Load Using: *A Generic OPE; Shaping the* Electrical Waveform Where: Motor Shaft Speeds Do Not Match the Mechanical Load Drwg: OP9", *Opto Generic Devices Inc: Optical Programming*, p. 20 (2001).

"Examples of N-dimensional Graphical Programming Drive Options Drwg: OP10", *Opto Generic Devices Inc: Optical Programming*, p. 21 (2001).

Dr. P. Pillay et al., "Voltage-Controlled SRM Drive Using Optical Graphical Programming Technology Report to OGD", *Division of Research, Clarkson University*, (2000).

Y. Liu et al., "A Graphical Approach to the Switched Reluctance Motor Performance Prediction and Drive Design", *Electrical and Computer Engineering Department, Clarkson University*.

P. Pillay et al., "A Novel Switched Reluctance Motor Drive with Optical Graphical Programming Technology", *Electrical and Computer Engineering Department, Clarkson University*.

Japanese Office Action dated Aug. 4, 2009 (English translation).

Japanese Office Action dated Apr. 6, 2010.

English translation of Japanese Office Action dated Apr. 6, 2010.

\* cited by examiner

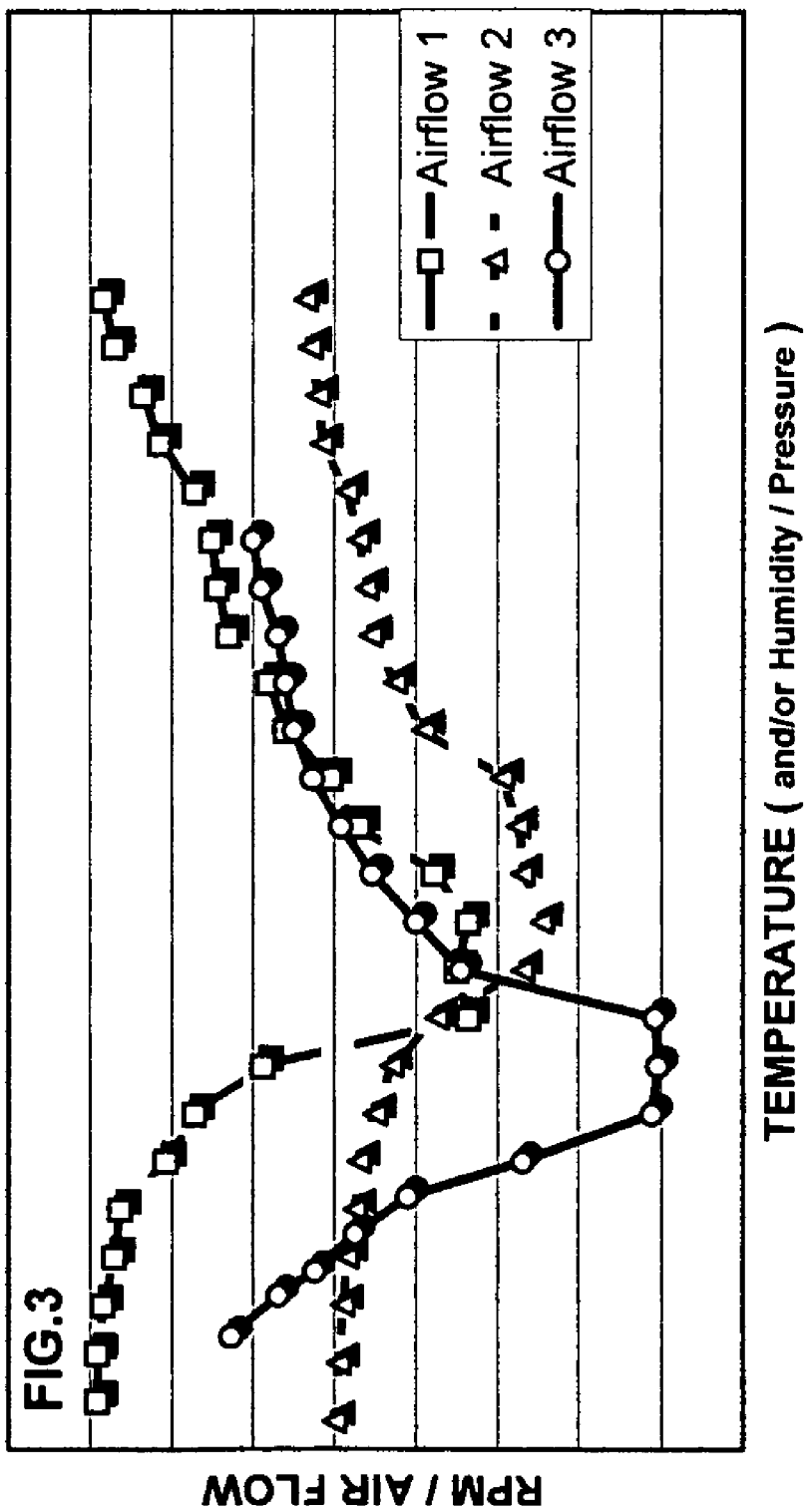

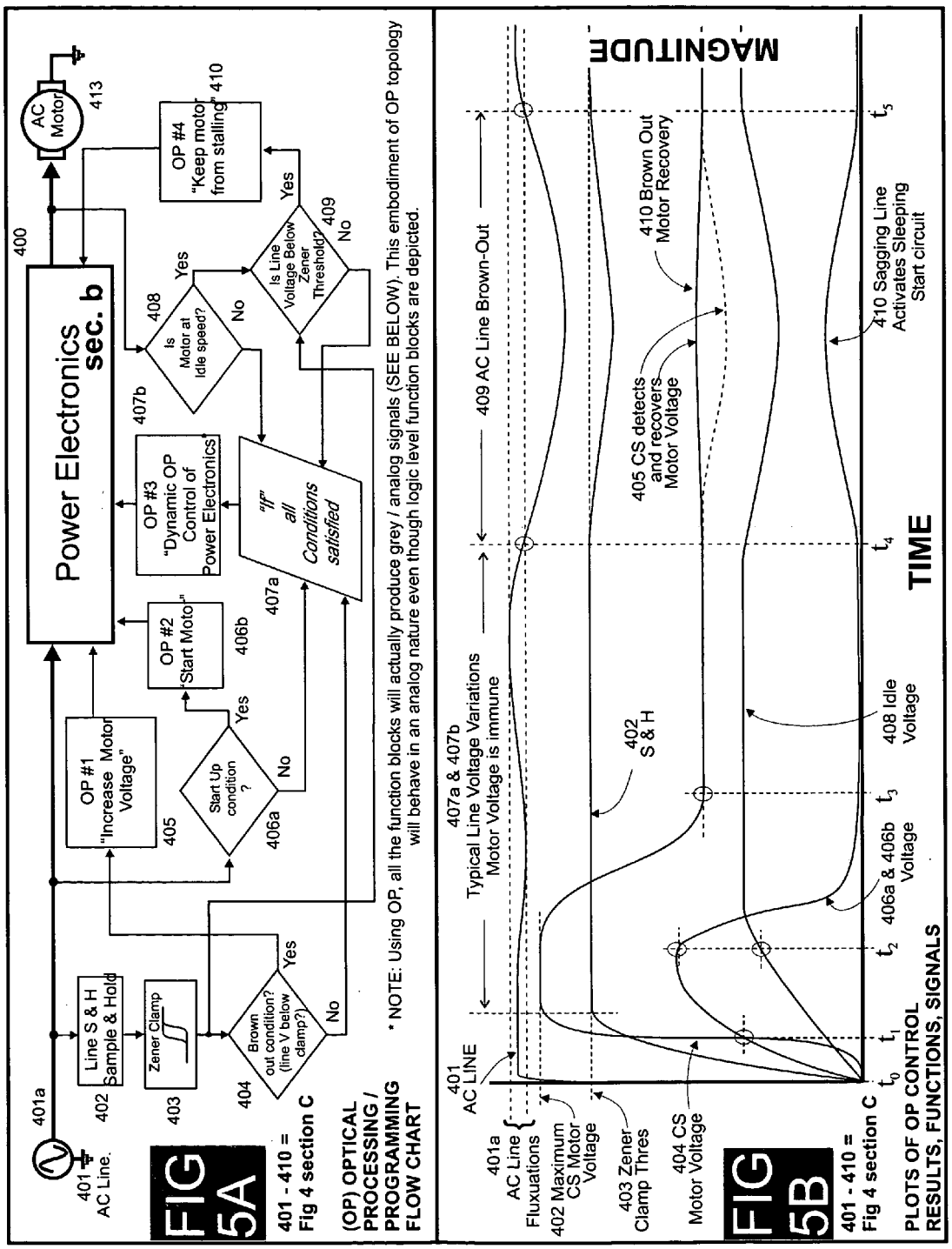

OPTO-PROGRAMMED HVAC CONTROLLER

FIELD OF THE INVENTION

This invention relates to the closed loop Optically Programmable (OP) dynamic direct analog control of Heating, Ventilating, and Air Conditioning (HVAC) equipment. Specifically, this invention continuously and concurrently Adapts supply air (fan or fans) output (discharge, indoor return, outdoor intake); as well as other climate conditioning variables like fluid flow heat or cool (fluid control valve); outside air (damper control) and/or other climate variables from one or more control inputs (digital or analog). This is done with a single compact simple package using OP based techniques that allow easy field or factory upgrade of HVAC equipment and systems to improve the climate, thermal and air quality requirements of a climate conditioned and controlled space.

DESCRIPTION OF THE PRIOR ART

The practice of slowing down or speeding up electric motors to meet changing indoor climate demands or requirements is common and there are numerous technologies that somewhat accomplish this. There are also several prior technologies that to a degree create, transmit and interpret environmental parameters that become the input criteria for altering motor speed.

The reasons for and outcomes of varying the speed of fan and associated electric motor in an HVAC system are manifold: 1) Improved process control to meet changing speed or torque demands on a motor-driven system; 2) Reduced ambient noise levels in occupied spaces as measured in decibels; 3) Reduced energy consumption as measured in kilowatt-hours (kWh) of electricity: 4) Reduced electric demand charges as measured in kW demand; 5) Improved control and maintenance of a desired temperature or humidity in a climate controlled area.

Additionally, there are a number of other benefits and improvements, though sometimes difficult to quantify, that have been verified and documented: fossil fuel savings, improved humidity control, improved Indoor Air Quality, improved safety, increased productivity, and decreased occupant illness and absenteeism associated with poor Indoor Air Quality and poor indoor climate or environmental control.

Prior art approaches in the HVAC industry have traditionally used Variable Frequency Drives (VFD); Variable Speed Drives (VSD), Adjustable Speed Drives (ASD), Pulse Width Modulated (PWM) Drives and other digital based techniques to slow down or vary speed of an asynchronous induction AC motor utilized to drive fans in HVAC systems. More common usage of VFD's et-al have been mostly on integral (larger multi-horsepower) horsepower AC motors in industrial and commercial systems and have not been extensively used on fractional horsepower AC motors generally because they are typically not cost effective.

Variable speed drives and related technologies have not traditionally been preferred or utilized for fractional horsepower motors for a number of reasons. They are usually much more expensive than the motor they are "added to". They often require that the motor being controlled be replaced with a more costly motor upgrade since most existing motors are not VFD compatible. The energy payback for such upgrades becomes much more difficult. VFD's often require added and complex hardware (hw) and software (sw) interfaces to the existing HVAC equipment they are installed on. They cause increased electrical noise to both the equipment and the AC grid and often require special added electrical filters.

In addition to VFD/digitally based drives or controller technologies, other less expensive means for varying the speed of an electric motor are also available. These lower cost technologies such as; voltage only adjust, "phase chopping" techniques, or other simple methods often are limited in many ways and can also cause serious motor or system problems. Some of which are: applicability to only a few select motor types, sizes, or applications; negative impact on motor operation and heating; difficult integration into existing HVAC equipment; fixed frequency; system damaging voltage and current spikes; inability to concurrently vary more than one variable at a time like frequency, voltage and phase; inability to easily interface to existing digitally based building management systems (BMS); higher internal electrical overhead; limited or negligible energy savings; high output of electromagnetic interference (EMI) and Radio Frequency Interference (RFI); limited range of motor speed control; and usually very limited control input and/or output capability.

Additionally some other prior art have opted for special purpose electric motors that are usually DC types (DC brushless, Switched Reluctance or Electronic commutated) versus AC induction types. Virtually all these newer style motors generally employ similar digital switching techniques and methods as outlined above for VFD et-al motor commutation and control. Thus in turn these "newer type digital switching commutation motors" encounter many of the same issues and problems outlined above for VSDs and other drives that are not analog based. Also though these may be a "single motor package" these special purpose motors seldom can be "drop-in" replacements or upgrades for existing AC induction motors and equipment without major product upgrading and revamping. As such they are not easy or recommended field replace units (frus) or field upgrades for other standard AC electric motor based HVAC systems.

Most of these cited prior art motor control technologies typically use one or more digital input signals generated by a complex yet limited software (sw) algorithm with complex and multi interfacing needed of both sw and hardware and have not typically relied on simple optical, or analog based controlling circuitry. Add in the ability to integrate, manage and control multiple input and output signals, sensors or devices on a concurrent or real time basis further significantly increases the complexity and cost of such digital controllers.

To accommodate such increased data rates and amounts of input/output signals often require adding or including digital signal processors (dsp). But dsps, which are quite complex in themselves, require still more controls, interfaces, software, etc to be able co-manage the added info increases further the complexity and cost. Some dsps with analog I/O features can go even further and directly capture, interface, algebraically sum, concurrently manage or control multiple input and output signals in a closed loop real time manner; such as proposed in this disclosure but using OP based techniques: but these dsp extras generally add-on such cost and complexity that it puts most of these digital based methods way out of the realm of affordability for fractional hp motors or consumer based products.

Since prior to this disclosure a low cost, multiple input, multiple output, high function fan motor control technology has not been cost effectively available to install on fractional horsepower AC motor based HVAC systems, many of these systems operate the motors and fans at either continuous high speed or completely off during occupied modes. These fixed speed motor systems force the occupants of the spaces they condition to sacrifice climate or environmental comfort in terms of temperature, humidity, noise and indoor air quality. These fixed speed units often consume much more electric and/or fossil fuel resources than necessary. These also can have a negative effect on other building systems and on utility power transmission systems in terms of excess demand. They can prematurely degrade electric motors, tax air conditioning systems resulting from excess heat generation, and they can cause increased health and productivity concerns for the occupants.

Some variable speed fan motor controllers have been developed that are intended for use in varying the speed of fractional horsepower motors in fan based HVAC systems and do not require integration into existing digital HVAC or BMS control systems that may be installed on the equipment. One example is described in U.S. Pat. No. 6,684,944 to Byrnes, et al. and U.S. Pat. No. 6,070,660 to Byrnes et al. wherein fan speed is continuously varied during the start-up and shut-down phases of the heating or cooling cycle using temperature sensing. On the surface this, like many other prior art systems, sound straight forward but it quickly gets quite involved and complicated in its implementation. For instance they utilize two separate controllers, two separate temperature sensors, in two separate places with a differential comparison between them. The speed is only "variable" at the start-up and shut down cycles (which have to be defined, timed, inputted and bracketed). They only "vary the fan speed" by only changing the voltage; which can sometimes severely limit (or harm) a motor's ability to operate unless the frequency is also proportionately varied. Often only the fan motor is/can be varied by the controller while other system motor driven devices remain fixed speed.

Another example of methods and apparatus for an HVAC control system is disclosed in U.S. Pat. No. 6,062,482 Gauthier. This, similar to the above appears to do some of the same climate conditioning improvements. But again the techniques become quite involved. There are numerous devices and sensors that have to be connected to microprocessors which instantly require numerous digital interfaces, busses, memory along with digital OS software, application software, cpu I/O's and much more; the cost and complexity quickly becomes significant. We believe much of this invention's limitations along with most of all the other prior art's limitations is primarily due to what is stated in Gauthier's Field of Invention. "This is . . . digitally implemented HVAC control", instead of an "opto analog" based technique.

Proportional/"variable" motor drive control systems have also been described that can integrate two incoming signals to produce an output signal. One example is described in U.S. Pat. No. 4,422,571 to Bowman for "variable output HVAC control". However this technique is applied to driving a damper (using a "variable speed" motor drive) but only to place the damper to one of two fixed positions. This variable damper positioning is actually fixed during operation to one of two positions at a time; it is the different damper mechanical openings that in turn then modulates the airflow, not a variation of motor or fan speed.

Utilizing one or more environmental input parameters associated with and/or generated by a mechanically conditioned and occupied space to create an output signal that has a resultant effect on the air flow rate into that space has been demonstrated in U.S. Pat. No. 4,353,409 to Saunders et al., and in U.S. Pat. No. 5,592,059 to Archer. But none of these indicate or teach that these signals, jointly or otherwise, can be used to directly and "adaptively" control or drive a fan motor's speed, or even to truly continuously vary motor or fan speed.

There are also numerous other techniques, methods and apparatus for improving and controlling the climate conditions in an indoor space, some of these contain various and novel ideas for such, but many of these also employ either fairly complex digitally based systems, or fairly limited triac based voltage only systems, or mechanical damper type controls, or only multiple stepped speeds (though often called variable speeds); but none disclose or teach "Adaptable speed control" ie fully, dynamically, continuously variable closed loop speed control.

An alternate low cost, simple, yet powerful technique to interface, control and improve (program) multiple input and output signals, sensors or devices via low cost simple optical means was described by U.S. Pat. No. 5,665,965 to Durham III. Additionally, the ability to integrate two or more signals, whether those signals are in the analog or the digital domain, or both, in a low cost, simple, yet powerful way has been detailed in U.S. Pat. No. 6,087,654 to Durham III, wherein again Opto Programming and Processing co-enabled this uniqueness.

From some of the above it is shown that sensors, devices, signals, data and more can be optically generated, controlled, mixed, and outputted with math, logic, algebraic, differential, integral or other algorithmic functions using Opto Programming and Processing (OP) techniques and methods. Building on and applying some of these optical based apparatus and methods has provided a totally new single, simple, low cost HVAC Control System (CS) package. This OP based CS can now be applied to a wide variety of existing HVAC products using standard AC induction motors both "at the factory"; and especially unique, also "in the field"; with minimalproduct cost or negative impact.

The current invention utilizes new specific OP based apparatus and methods to integrate multiple, similar or dissimilar inputs (either analog or digital) to generate multiple, like or dissimilar outputs (either analog or digital). This CS provides an "Analog based; low cost, simple, yet powerful and functionally rich OP based multi-parameter HVAC climate control conditioning system. This is not only an improved climate system control and at a much lower cost and much simpler technique, but one that can be easily integrated into or paralleled with the majority of existing HVAC products and control schemes. Also usually regardless of the existing unit complexity level and basis of function, this CS can be easily added at the factory (ie oem) level or at the field (retrofit/upgrade) level.

OBJECTS OF THE INVENTION

It is therefore a principal object of the present invention to provide closed loop, dynamic, Opto Programmable management and control of HVAC systems with both apparatus and methods that improves climate conditions by continuously and adaptively altering/varying system or unit air flow and air thermal capacity to improve comfort and air quality in a climate controlled space, using a single simple multi-parameter control and power package that can be factory or field installed.

It is a further object of the present invention to utilize one or more new, Opto Programmed (OP), non-linear air flow versus climate—air temperature profile(s).

It is another object of the present invention to recognize and adapt discharge air-flow rate to be a function of at least both air temperature (degrees) and air thermal capacity (btus); as well as other climate variables as needed or desired.

It is another object of this invention to provide a single point of control technique that concurrently controls and adapts to the heating and cooling modes of an HVAC system without the "need" of manual intervention.

It is another object of this invention to provide a single point of control that can create and "program" the appropriate (and different) temperature profile(s) for both heating and cooling modes without external HVAC system intervention or system reprogramming.

It is a yet another object of the present invention to provide an HVAC control system that continuously varies or alters air flow in an "adaptive and re-programmable proportion" to the discharge air temperature and thermal capacity of the equipment whether in heating, ventilating or cooling mode singly or overlapping and/or combined.

It is a yet another object of the present invention to provide "thru the wall" HVAC control systems with this new art by getting rid of poor sealing/fitting rectangular oversized holes and electro-mechanical (or mechanical) outside air (OA) dampers to passively bring in outside air; and replacing such with much better sealing/fitting smaller round hole (or holes) "thru the wall" to the outside coupled to a separate variable speed outside air (OA) fan (or fans) to control, vary and improve the amount of needed outside air.

It is yet another object of the present invention to reduce energy consumption of the fan motor as measured in kWh by maintaining a programmable "maximum or high" speed fan setting that is always less than full line voltage by a selectable/programmable percentage.

It is yet another object of the present invention to reduce energy consumption of the fan motor as measured in kWh by adapting and adjusting the percent maximum speed reduction below line voltage so this percentage amount can account for or ignore line voltage fluctuations. If the line voltage drops it can "hold voltage" by lowering the percentage drop; while if the line voltage increases it will "hold voltage" by increasing the percentage drop; or it can be programmed to ignore such adapting and just "follow a fixed percentage below" the AC line.

It is an object of this invention is to improve fan motor torque and energy efficiency on permanent split capacitor motors (pscs) by separately controlling the start and run windings.

It is yet another object of the present invention to prevent excessive motor inrush current and excessive system start-up stress by providing an Opto Programmable (OP) "soft start up"—gentle sequence.

It is yet another object of the present invention to effect kW demand reductions and kWh usage reductions by providing a "more gentle" motor speed ramp up or "soft start" that uses significantly less energy to start up a motor.

It is yet another object of the present invention to reduce the premature failure of electric motors and reduce motor burn-out's when exposed to supply voltages that drop during periods of high demand, commonly known as "brownouts" by providing "detection and speed recovery" and/or "brown-out ride through capabilities" via dynamic voltage/frequency control and adjust.

It is yet another object of the present invention to help provide some safeguards to application and system operation by providing brown-out "detection and speed recovery" and/or brown-out ride through capabilities.

It is yet another object of the present invention to dynamically adjust, adapt and blend motor voltage, frequency and phase as needed to cost effectively optimize and improve motor and/or system performance.

It is yet another object of the present invention to improve motor longevity using soft starts; more gentle operation and transitions; optimizing voltage, frequency (v/f) and phase (v,f,φ) as needed; operating at the minimum voltage/power level needed (generally much less than line voltage power); and much fewer full on-off cycles.

It is yet another object of the present invention to maintain higher levels of comfort in the occupied space by "precisely and continuously maintaining a minimum air flow—idle level" of heated and/or cooled and/or ventilated air into the occupied (or unoccupied) climate space.

It is yet another object of the present invention to not stop (turn off) the fan motor air-flow; but instead to maintain unit fan motor speeds to a minimum operating level or to an "idle speed" by setting a "motor friendly" programmed minimum voltage and frequency.

It is another object of this invention to prevent motor stalling during "idle level" or minimum/low speed operation due to system anomalies or other variables by detecting, adjusting and maintaining motor operation/speed as per OP'd settings.

It is another object of this invention is to improve fan motor low speed or "idle level operation" of permanent split capacitor motors (pscs) by separately controlling the start and run windings.

It is yet another object of the present invention to maintain higher levels of comfort in the occupied space by "gently but precisely and Continuously Varying or Adapting" air flow to climate needs and therefore the transmission of heated and/or cooled and/or ventilated air to minimize temperature fluctuations.

It is another object of this invention to reduce/prevent coil freeze-ups by detecting coil airflow temperature and air capacity and dynamically and continuously adjusting or adapting airflow to lead or lag air temperature as needed.

It is another object of this invention to reduce/prevent heat exchanger burnouts by detecting heat exchanger airflow temperature and air capacity and dynamically and continuously adjusting or adapting airflow to lead or lag air temperature as needed.

It is yet another object of the present invention to conserve fossil fuel and/or electric energy required to generate the heating or cooling capacity delivered to a heat exchanger or condenser by reducing excessive over heating or cooling.

It is yet another object of the present invention to increase available capacity of facility heating and or cooling plants through prevention of over heating and/or over cooling of individual zones thereby minimizing system effect losses.

It is yet another object of the present invention to reduce noise levels in occupied space by always controlling/adapting motor speed to the minimum speed (minimum noise) needed to match/maintain thermal output needed.

It is another object of this invention is to reduce fan motor operating noise and especially during "idle level operation" by separately controlling the start and run windings of permanent split capacitor motors (pscs).

It is yet another object of the present invention to reduce noise levels in occupied space by adaptively controlling and maintaining a high speed that is less than full line voltage.

It is yet another object of the present invention to reduce noise levels in occupied space by providing the ability to concurrently reduce electrical frequency below 60 Hz along with reduced voltage and phase adjust, when/if needed.

It is yet another object of the present invention to improve, maintain, or provide the introduction of an adequate supply of outside air using adaptive or variable control techniques to meet air quality and ventilation standards.

It is yet another object of the present invention to reduce humidity during the cooling cycle by reducing air velocity across the cooling coil surface and by lowering over-ventilation.

It is yet another object of the present invention to improve air quality of the space being conditioned by increasing the efficiency of certain filter media present in the HVAC equipment by reducing the velocity of air passing through the coil.

It is yet another object of the present invention to reduce motor speed without also producing the excess or added electro-magnetic interference (EMI), radio frequency interference (RFI), power factor distortion (PF) and total harmonic distortion generally caused by other motor speed controllers.

It is yet another object of the present invention to provide an interface allowing infrared or radio transmitted, full remote control of all HVAC Controller capabilities.

It is an object of the present invention to reduce motor speed while consuming very little electrical overhead in the existing HVAC control system.

SUMMARY OF THE INVENTION

This invention recognizes the complex nature of good climate control is a combination of multiple overlapping parameters and variables that need to be concurrently captured, monitored, managed and controlled. Many others also have recognized such needs but this invention is unique in that it controls and integrates them in a simple, yet significantly improved way. It uses OP methods and apparatus that for instance allows using a very sophisticated non-linear temperature/climate vs airflow profile that enables an improved transfer of heat/cool energy with a simple, low cost yet tailorable technique; but it does this, along with many other concurrent parameters if desired, all in a single, compact package.

This new HVAC Management and Control system can accept a single input, multiple inputs or various combinations and simultaneously generate a single output, multiple outputs or combinations using "OP based mixing techniques" as previously disclosed in Durham U.S. Pat. No. 5,665,965 FIG. 12A. The inputs can be from one or multiple sensors generally located in the discharge air stream (or other locations) and could be temperature, humidity, pressure, CO, CO2, occupancy, etc types. Besides direct sensor input, other system control signals that are voltage, current, impedance or electronic either analog or digital based can also be used as control inputs. System devices or sensor inputs, or any combination of, or extension of them can be combined or OP'd as desired. Outputs (both control and/or power) can also be generated in a similar range of electrical formats or a combination and/or extension of above.

The HVAC control system receives the above input(s) and generates the above output(s) to affect, at a minimum, one or multiple motor speeds (fan, damper, valves, etc) as required. Other non-motor but electric based controlled air dampers and/or control valves can also be varied or managed by this same, simple, single HVAC control system.

Based on the input(s) the HVAC control system varies motor(s) speed(s) to match the level of heating or cooling available (typically defined in terms of temperature and/or of btu's) in an HVAC system. In the "auto or climate control mode" the present invention control system causes the fan motor to continue operating at an "idle or very low speed" if no excess heat/cool is available in the heat exchanger/coil, instead of staying on full speed or shutting off. This "idle speed mode" allows for a smooth continuous gentle airflow that maintains a better balance, tighter and much improved control of room climate and air quality.

As heat (or cool) becomes available in the heat exchanger/ cooling coil the control system recognizes the increase in available heat (or cool) through one or more air stream based OP'd sensor(s) and increases the motor speed/airflow in a gradual adaptive continuous manner. This is done using an improved unique, non-linear programmable profile. This same adaptive process can be in a heat only or in a cool only or as described in this disclosure it uniquely also allows for choosing an "auto climate mode" of adapting to heat and cool dynamically.

This adaptive motor speed OP non-linear temperature (climate) profile provides improved comfort levels in the occupied space by further recognizing the non-linear complex nature of heat output. A heat exchanger delta temp of 10 degrees ° F. from 65° F. to 75° F. has a different btu capacity than a 10° degree delta from 95° F. to 105° F. As such a linear slope temperature profile, often used by competing prior art, does not recognize or capitalize on this fact. Yet though non-linear, the relationship is a proportional and programmable relationship of air flow to "heat/cool capacity available" (air temperature and btu capacity).

The Control System can affect the similar changes in a cooling system. In a cooling system the fan motor speed increases as the discharge air temperature gets colder (below set point) and returns to an idle speed when the discharge air temperature gets warmer (approaches room ambient) and the cooling coil becomes inactive because the occupied space temperature (or some other control parameter) is satisfied. However, as with heating cycles, this invention recognizes that air flow versus air temperature is non-linear, and programs the appropriate curve accordingly. For example, in the heating mode there is an operating range of greater than 100 degrees F. from ambient, and in the cooling mode the operating range is less than 50 degrees F. from ambient.

This adaptive continuous temperate control, besides giving much better temperate climate operation, significantly reduces motor, fan, and air noise; and improves humidity and air quality characteristics of the HVAC system. Also in many cases air quality can be further improved and more precisely controlled if the equipment being controlled is capable of introducing outside air in a proportional and controlled manner. And additionally it has been demonstrated and disclosed that the proper type of air filter used in conjunction with this CS can greatly enhance indoor air quality.

In addition to improving the environmental characteristics listed, the HVAC control system can extend motor life, allow a motor to ride through or survive a brownout situation, decrease the likelihood of a motor stalling in low voltage operation, reduce electric and fossil fuel usage, reduce electric demand, reduce system effect losses in the central heating or cooling system, minimize RFI, EMI and harmonic distortion, and operate with very little electrical overhead at the HVAC control system level.

BRIEF DESCRIPTION OF THE DRAWINGS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Referring to FIG. 1a, 101a represents an example of a wall mounted installed complete univent type of HVAC equipment with typical devices and systems often found in occupied environments such as classrooms, institutions, office buildings, etc with "thru the wall outside air intake". This figure shows the way in which a field type of retrofit and upgrade from a fixed speed fan based system to a fully adaptive variable speed one could be done; but this "upgrade" could just as easily be done at the factory level.

Figure 1A:
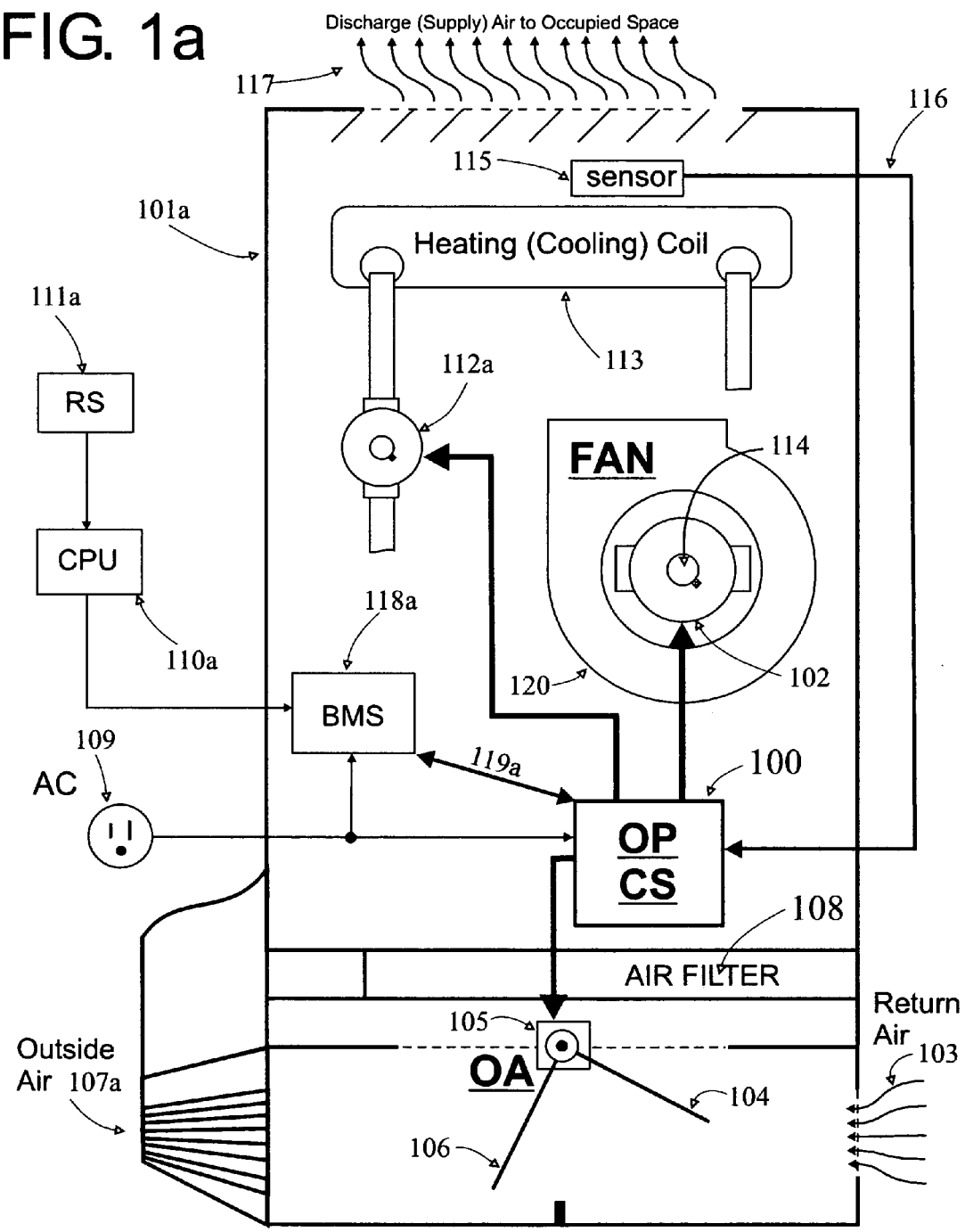

This example shows a heating and/or cooling system with outside air ventilation; wherein a room temperature sensor 111a provides an input of occupied space temperature to a personal computer-based (or other programmable intelligent based control) front end 110a of an automated building management system which interprets that input. The space temperature may or may not be integrated with other environmental inputs into an algorithm in the front end 110a and a resultant signal is then sent to the building management system controller 118a within the HVAC equipment 101a being controlled.

The building power supply system 109 provides 120/240 Vac power (or whatever operating power is available and needed by the HVAC system devices) to either the building management system controller 118a and/or to the HVAC Control System 100. Or if the building management system controller 118a is first fed with 120 (or 240) Vac power it then can feed the HVAC Control System (CS) 100 with 120 (or 240) Vac power.

115 is a temperature sensing thermistor pair in a bridge configuration (SEE FIG. 4a sec d for climate conditioning/temperature control circuit set-up) for heating for cooling or for both, that is placed in the discharge air stream 117 of the HVAC equipment 101a. The thermistor bridge 115 is connected to the HVAC CS 100 by cable 116 which carries the discharge air 117 temperature information to the HVAC CS 100. Based on the signal from the thermistor bridge 115 (SEE FIG. 3 for type of temperature signal profile) the HVAC CS 100 relies on it's internal Opto based programming (OP) (SEE FIG. 4a sec g) to send a proportional voltage (and proportional frequency as needed) to the motor 102.

In the heating mode a discharge air 117 temperature greater than the programmed temperature profile results in a higher voltage (and proportional frequency as needed) signal to the motor 102 thereby increasing motor speed and the fan 120 speed resulting in increased air flow to the occupied space (SEE FIG. 3 for actual examples of climate/temperature control profile). Similarly in the cooling mode a lower discharge air 117 temperature (than what is OP'd) also results in a higher voltage (and proportional frequency as needed) signal to the motor 102. In each case motor 102 speed is continuously and adaptively changed in a programmable proportion to actual discharge air 117 temperature/climate (as per FIG. 3 & FIG. 4a sec d).

Additionally through the expanded multi-dimensional control provided by OP, the HVAC CS is uniquely capable of being programmed (set to an auto or climate control mode) so that the CS will adapt to both heating and cooling profiles without manual or BMS intervention. It can also include other environmental parameters like humidity and pressure as illustrated in FIG. 3. This allows full control and upgrade with a single simple system wherein the HVAC CS is able to capture, sense and adapt system climate parameters to system needs without costly, complex added devices and application or system re-programming or manual intervention.

Figure 2A:
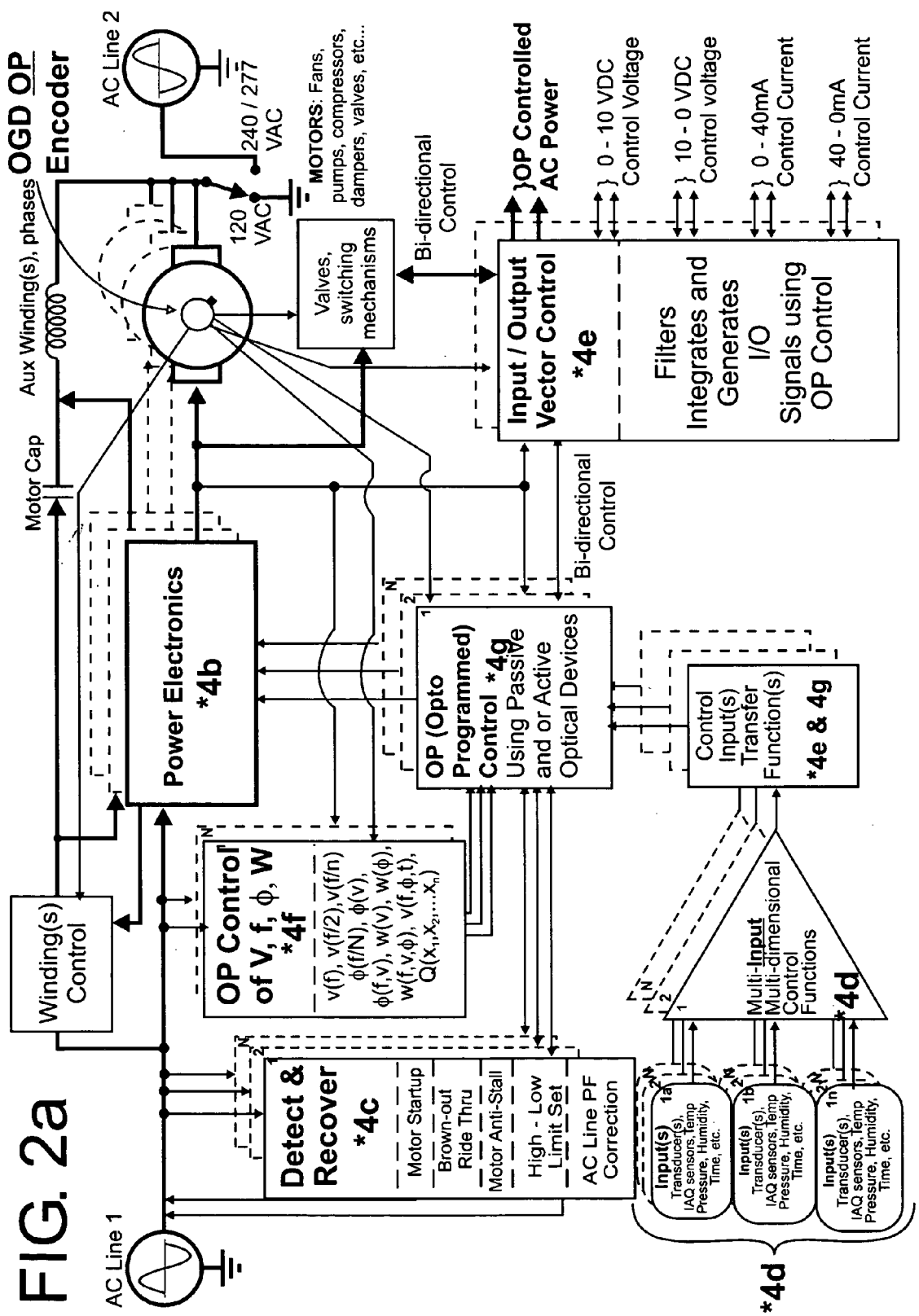
Figure 4A:
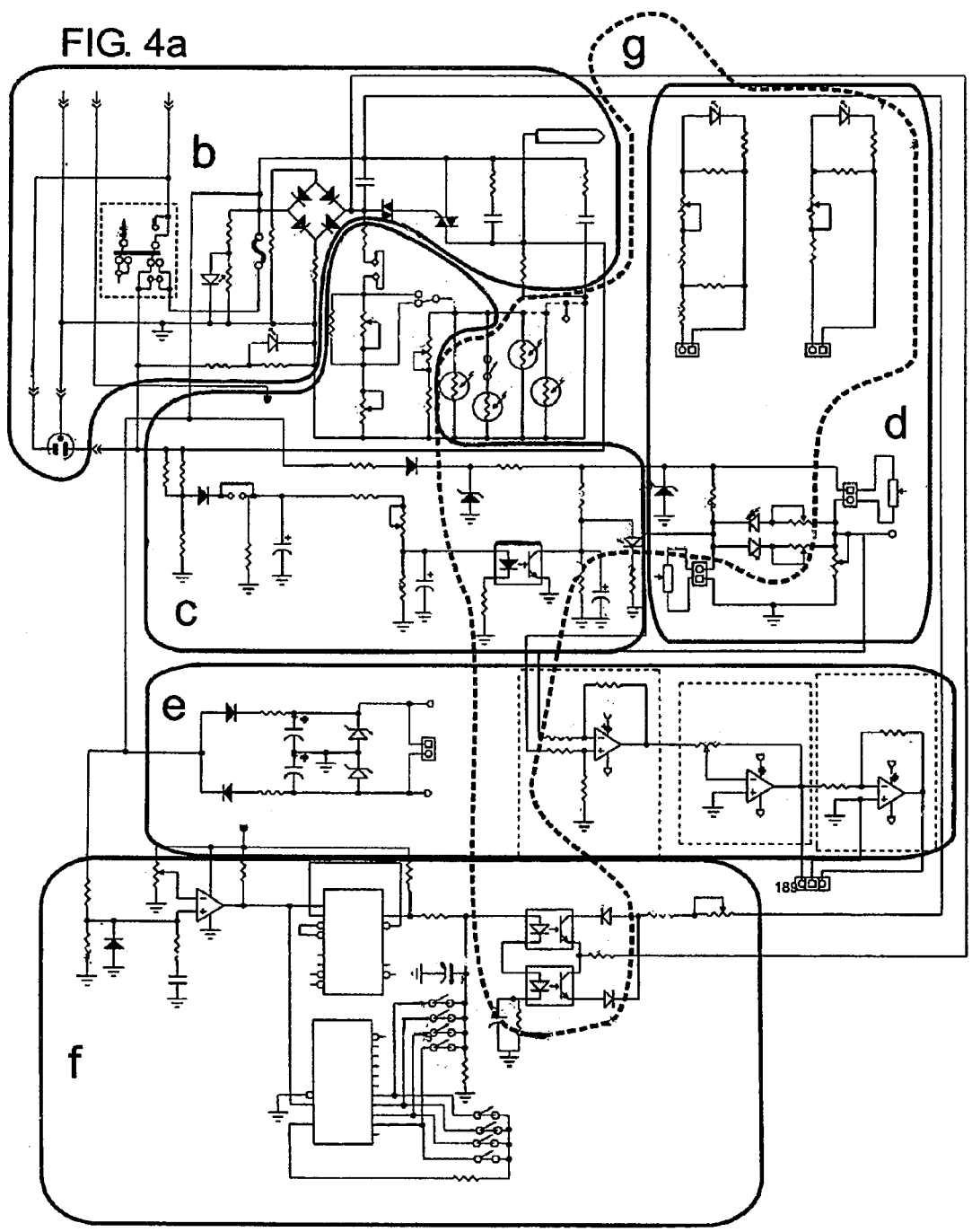

The HVAC CS 100 is capable of communicating with the existing building management system controller 118a through communication cable 119a wherein signals sent to or received from the HVAC CS 100 can be utilized to alter HVAC equipment 101a output (SEE FIG. 2a sec 4e and FIG. 4a sec e & sec d). The HVAC CS 100 is also capable of sending a signal(s) directly or inversely proportional to air flow to either the damper actuator 105 or to the control valve 112a or to both. A variable control signal(s) and/or power voltage (0 to: 10, 24, 100, etc or the inverse) from the HVAC CS 100 can be sent to modulate the air damper actuator 105 to provide an increased proportion of outside air 107 by increasing the opening of the outside air damper 106 while simultaneously diminishing the proportion of return air 103 by decreasing the opening of the return air damper 104 (SEE FIGS. 2a & 2b 4e & 4g and FIG. 4a sec e & sec d). Similarly, a direct control signal(s) or power voltage(s) can be sent to the control valve 112a to modulate the amount of hot or cold water or steam going to the heat exchanger or coil 113.

Based on a signal generated by a room thermostat or sensor 111a to increase or decrease space temperature the building management system controller 118a or the HVAC CS 100 may send a variable, proportional (or simply on/off) signal to the control valve 112a to modulate the percentage it is open or closed. As the temperature of fluid in the coil 113 changes based on the changing position of the control valve 112a the discharge air temperature 117 also changes and the Opto Programmed thermistor bridge 115 sends a variable signal to HVAC CS 100 a (SEE FIG. 3 & FIG. 4a sec d) to alter the speed of the motor 102 and the fan 120 to adapt accordingly.

The HVAC CS 100 as earlier noted can provide a voltage to the motor 102 that is less than line voltage even at highest operating speed (SEE FIG. 5B 402; FIG. 4a sec b & sec c). With a proper type of air filter 108 installed, it has been shown that if full fan speed air is at a reduced velocity more airborne particulates can be captured. As the fan airflow 120 slows down with changing discharge air 117 temperature, velocity continues to decrease allowing even more airborne particulates to be captured.

The HVAC CS 100 can further improve the performance of HVAC equipment 101a if a Graphically Programmed or Opto Programmed (GP/OP) Shaft Encoder 114 is mounted on a motor shaft. Encoder 114 provides real-time motor commutation and control algorithms that can directly drive the electrical motors and devices in 101a. For instance besides giving the fan variable speed it can give the fan: over-speed (ie greater than maximum AC line speed) and it can give the fan significantly more torque at the same speeds.

As described in Durham U.S. Pat. Nos. 5,665,965 & 6,087,654 a GP/OP encoder can add a number of other functions to an electric machine's function a few of which are: it can dynamically and graphically change frequency, phase, wave shapes and patterns improving and expanding performance. Also a Graphically or Opto Programmed Encoder could concurrently control and improve the operation of a compressor or coil condenser. It could not only also make them adaptive speed and do much of what was described above for fans but an OP encoder can provide nonlinear dynamic commutation profiles for compressors dramatically improving their performance and lowering their inefficiencies and operating temperature.

Besides these motor based devices being especially improved via an OP encoder the control and commutation data could be used to coordinate and direct BMS 118a functions and/or concurrently control valves 112a, dampers 105 as well as other related 101a devices. For the basis of this disclosure many of these added features described and enhanced via an OP/GP encoder are not disclosed or utilized.

Figure 1B:
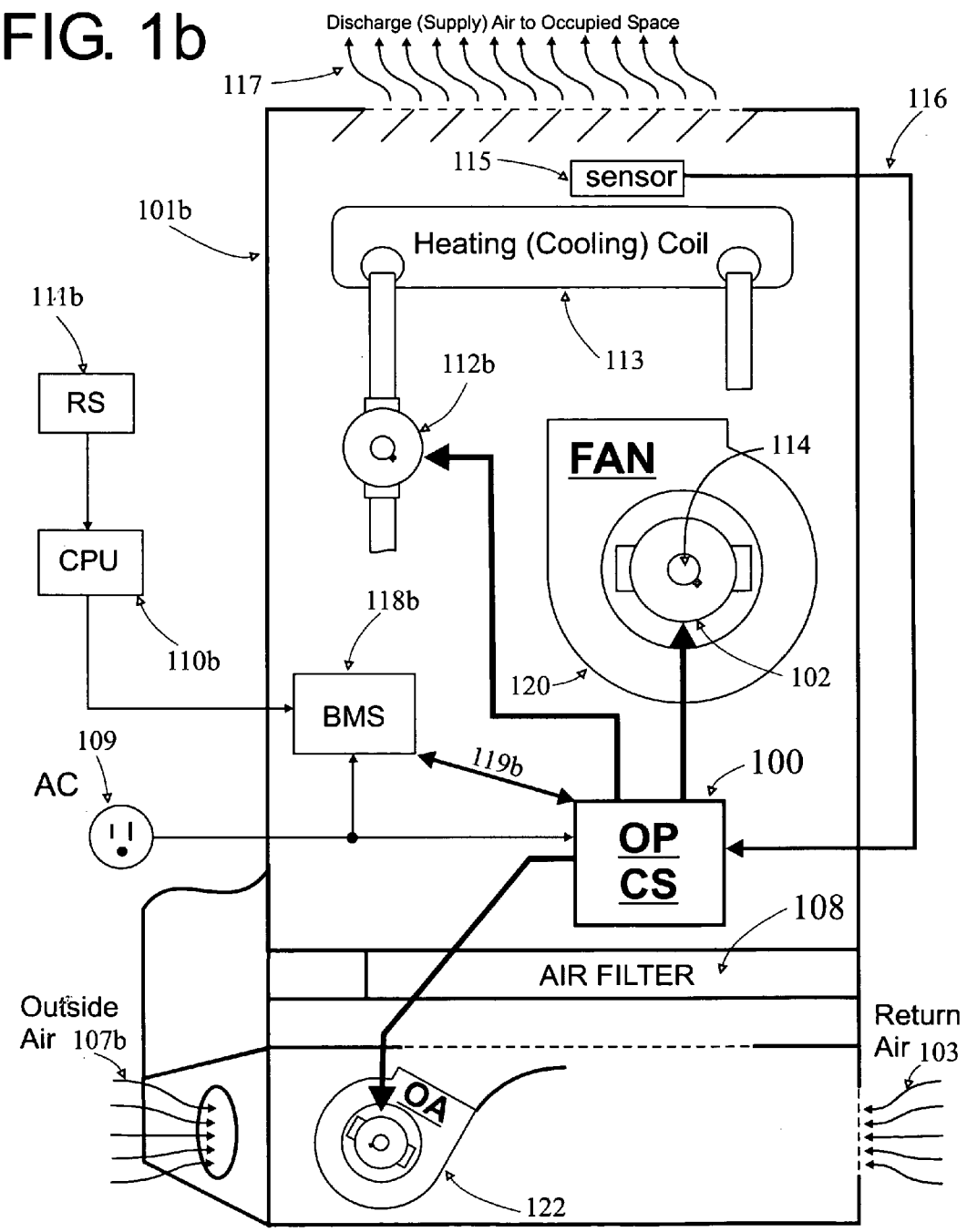

Referring to FIG. 1b

It is very much similar to FIG. 1a with many of the same features and functions described for FIG. 1a. But FIG. 1b shows the new art of improving an HVAC univent's "thru the wall" outside air control and construction. This discloses getting rid of a electromechanical (or mechanical) outside air (OA) damper 104, 105, 106 and a poor sealing/fitting rectangular oversized hole 107a to passively bring in outside air; and replacing 107a with a much better sealing/fitting smaller round hole (or holes) 107b to the outside and use a separate variable speed outside air (OA) fan 122 (or fans) to vary or control the amount of needed air and replace 104, 105, 106 damper devices.

This would provide much improved variable air flow control as an OP controlled fan would clearly offer better and more precise airflow than a mechanically actuated and positioned damper. It would provide improved static pressure control. It would lower the cost and complexity of putting holes through walls (smaller round hole or holes vs one long large rectangular opening). It should enhance overall HVAC system performance just as indoor fans did over passive convection based systems. It would enable more system options (added filters, multi holes with closures, reverse airflow, etc).

Figure 2B:
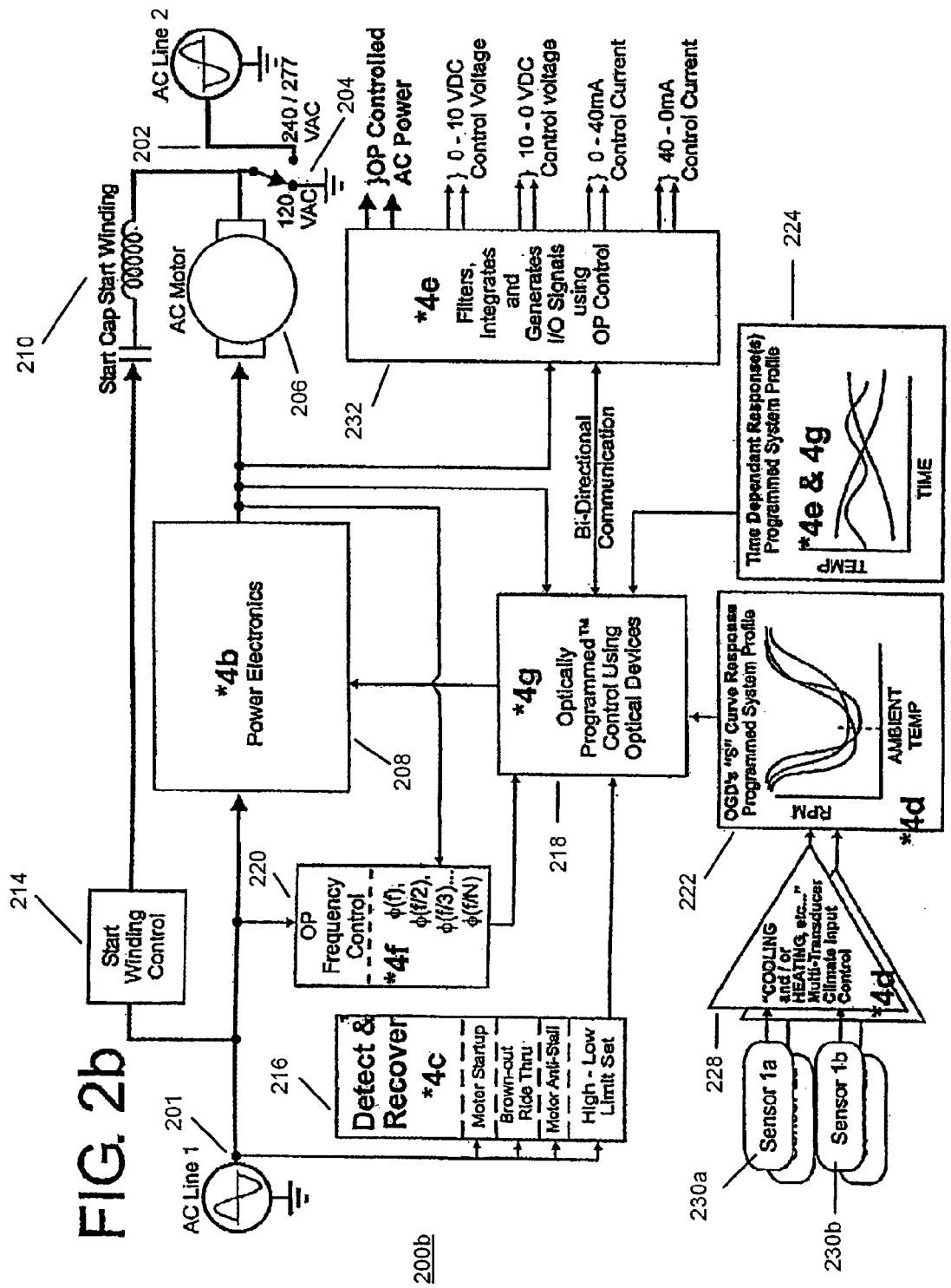

Referring to FIG. 2a and FIG. 2b:

FIG. 2a describes and discloses a "Generic method and apparatus embodiment" of the new art HVAC Management and Control System (CS) using block diagrams, functional descriptions and info and data flows. Multiple configurations are depicted showing the broad and diverse features and functions that the single CS package is capable of providing. FIG. 2b further describes and discloses a "Specific method and apparatus embodiment" of this new art HVAC Management and Control System (CS) using block diagrams, functional descriptions and info and data flows that has been implemented and reduced to practice.

Both FIGS. 2a and 2b show modular Optically Programmed (OP) Top-Down approach to circuit and system design. Circuit and system function blocks are designed and implemented with the notion that input and/or output signals, to each of the blocks in general, will be, but not limited to, optical or OP signals.

System design and implementation begins with an "analog logic" level approach, with a flowchart type methodology. But unlike using digital with "on/off" or "1's & 0's, this method uses "grey" states of function blocks as considered in the design.

In general, optical signals are rich in multi-dimensional information content. Several simultaneous functions, computations, transformations, may exist on/in a single OP block, where functions, computations, transformations can be performed simultaneously and multi-dimensionally on optically programmed signals. This allows us to utilize smaller simpler electronic circuits while increasing the functional complexity of these circuits to perform several multi-layer analog functions simultaneously.

An example of an OP circuit and system implementation would be a sub component of OGD's A1 system depicted in generic block form in FIG. 2a, more specific in FIG. 2b and actual circuit implementation in FIG. 4a.

Some of the functions and details of FIGS. 2a & 2b are further discussed in a specific function implementation of FIG. 3 air-flow vs climate profile plots, in FIG. 4a schematic and circuit implementation via the sub circuits 4b to 4g; and FIGS. 5a & 5b actual test result plots. These subsequent figures show an actual implemented and functioning configuration reduced to practice that accomplishes the described invention capabilities, while FIG. 1a is a disclosed full system embodiment of the generic methods and means for any and most CS options.

Starting with the AC Line of FIG. 2a the input power that can be used and managed by this CS can be 110/120 vac or 220/240 vac or other similar single phase voltages and either 60 or 50 hertz. Next the section 4c is a motor control area that does several basic functions such as: Motor soft or gentle start-up; Brown-out detect, recovery or ride thru; anti stall, etc; sec 4f shows the area that controls frequency and phase; there is a section to separate control of the start winding from the run winding and then the power electronics sec 4b. The other sections such as 4d and 4g are control sections using OP to capture, integrate, program and utilize various functions, signals and data to effect output control of sec 4b and 4e.

This FIG. 2a overview of the disclosed CS and its generic means are repeated in FIG. 2b; however FIG. 2b is a representation of an actual apparatus that has been built and functioning in a low cost compact single package. Further the following FIGS. 3, 4a & 5a, 5b all also represent this same packaged configuration. In these subsequent figures the same sections shown and described in FIG. 2a correspond to the actual embodiment in these other figures; for instance FIG. 2a sec 4c described above about the motor start-up, brownout etc. operation are all actually embodied in the circuit shown in FIG. 4a sec c. Similar corresponding functions and features exist for all the other elements in FIG. 2a and FIG. 2b.

Referring to FIG. 3

This is an example of the method of non-linear air discharge temperature to airflow profiles that can be simply Opto Programmed into the temperature (climate) section of the control circuitry (see FIG. 4a sec d). As illustrated any number of profiles can be configured to react to both heating and cooling temperatures (or other climate/environmental parameters) in a range of response curves that can be easily optimized for the actual occupied space needs. The option is included for this new disclosed CS to be set as most traditional HVAC systems are; where-in the heating and cooling activity is separate, distinct and the CS is "told, instructed or changed" manually or via the BMS program as to when to switch modes (SEE FIG. 2b sec 4e).

However the disclosed CS also has the unique ability to concurrently operate intelligently and adaptively in both heating and cooling modes dynamically without "intervention or help" (in HVAC units where the same discharge air outlet is used to climate condition the occupied space for both heating and cooling). As noted in the various plots shown and discussed in FIG. 2b sec 4d; the upper and lower ranges of both airflow (fan motor speeds) and temperature bounds are completely adaptable such that this one HVAC CS is capable of controlling a vast array and types of HVAC units; and allows the placement of the sensor(s) closer or farther from the heat/cool source as preferred and yet still give a full control range.

The minimum or "idle speed" that allows and maintains a "gentle but continuous" airflow is also settable (programmable) such that it can be higher, lower, wider or narrower in its profile. This allows for various minor room temperature fluctuations that may have little to no relation to actual system induced changes (ie call for heat or cool) to have minimal to no effect on airflow rates. Yet if/as the temperature continues shift from set point (ambient) the profile will note such and begin to adjust the airflow accordingly bringing the system back into equilibrium. Conversely a very sharp profile minimum could be programmed so the system will more aggressively react to changes in climate.

Although temperature is illustrated as the primary driving parameter this could be the resultant of a temperature change only or it could be the composite resultant of several concurrent parameters that are opto blended to be the airflow basis. For instance as shown in FIG. 2b sec 4d, 4e, 4g the temperature change could be moderated or profile altered based on the humidity such that the rate of airflow might be steeper or flatter on the cooling side based on the humidity. Or static pressure is another climate condition that could alter the resultant. Others have previously disclosed the need to potentially factor more than one temperature control point into the control algorithms also; but none have disclosed the simple nature of concurrently sensing, capturing, tracking, reacting to and consolidating all these multi-parameters (climate based, BMS directed as well as other sensors and devices) into a single control vector using OP techniques.

It is this unique multi-dimensional concurrent ability for OP to blend various climate factors, BMS signals and other parameters into a signal or signals as described and disclosed in FIG. 2b sec 4d, 4e, 4g and that interface to and interact with a single CS OP circuit as implemented in FIG. 4a sec 4d, 4e, 4g that distinctly make this new methods and apparatus. Also none have done so with the rest of the simple but capable OP circuit techniques as disclosed in FIG. 4a that offer so many other functions (ie voltage, frequency, phase control). The fact that all these multiple functions, features, methods and apparatus can all be used to set/drive one or more parameters that in turn can cause an adaptive continuously variable control response sets this apart from prior art.

Referring to FIG. 4a

FIG. 4a describes and discloses a specific apparatus embodiment of the current HVAC Control System (CS) schematic and circuit showing the actual implemented and functioning configuration that accomplishes the described invention capabilities. Although this is a complete and functioning system schematic or circuit; it is to be understood that other circuit embodiments may be utilized and structural changes may be made without departing from the scope of the invention.

FIG. 4 section b or sec b is a part of the schematic diagram of the HVAC CS circuit in accordance with one embodiment of the present invention wherein the power electronics are configured wherein input power, output power and some phase angle power circuitry is shown. These are all dynamically closed loop controlled and directed by the following circuit elements described and disclosed below which utilize in most cases Opto Programmed techniques to effect such control.

FIG. 4 sec c is a part of the full schematic diagram of the HVAC CS circuit in accordance with one embodiment of the present invention wherein Opto Programmed (OP) techniques and OP circuitry are used to provide an apparatus that can "detect, recover and effect" the following functions: AC motor "soft start"; AC motor "stall recovery" and AC motor "brownout ride through". All these control functions are accomplished in the circuit elements disclosed in FIG. 4a sec c; but to illustrate how extensive the control is that this single section of OP circuit can effect is featured in FIGS. 5a & 5b. In FIG. 5a a flow chart and block functional diagram is described while FIG. 5b shows actual test plots of what this OP circuit can do. This one example is provided to show sec c's specific features in an expanded overview of the programming and logic that are built into the tis part of the circuit, but the entire circuit FIG. 4a for the various other OP circuit sections 4d to 4g listed below could be similarly elaborated with such detailed functional charts and plots.

FIG. 4 sec d is a part of the full schematic diagram of the HVAC CS circuit in accordance with one embodiment of the present invention wherein Opto Programmed (OP) techniques and OP circuitry are used to connect, control, interface and program "climate type" input sensors and signals. Temperature is one of several parameters that can be directly captured, inputted, tuned or profiled and then interfaced to the rest of the HVAC CS circuitry and function (SEE FIG. 3). Examples of these various profiles and options (all available and capable using the disclosed circuit 4a section d) are expanded and shown in block diagram form in FIG. 2b sec 4d (and also some of FIG. 2b sec 4e & sec 4g).

FIG. 4 sec e is a part of the full schematic diagram of the HVAC CS circuit in accordance with one embodiment of the present invention wherein Opto Programmed (OP) techniques and OP circuitry are used to connect, control, interface and program other input and output (I/O) devices, motors, sensors and signals to be interfaced. The disclosed circuit control level signals are at 0 to 28 vdc and/or 28 to 0 vdc with filters and integrators as shown here; but this is in no way limited to said volt or signal levels and these I/O controls could be power voltages up to the actual fan motor's power output level(s). FIG. 2b sec 4e as well as FIG. 2a Output Control illustrate and disclose the expanded nature of the input/output options.

FIG. 4 sec f is a part of the full schematic diagram of the HVAC CS circuit in accordance with one embodiment of the present invention wherein Opto Programmed (OP) techniques and OP circuitry are used to provide and effect a range of adaptive frequencies tuned to match output voltage can be Opto Programmed for various voltage/frequency (V/F) curves. This ability to co-program and vary frequency concurrent with other circuit functions is another unique apparatus and method disclosure for such simple phase control type circuits. FIG. 2a OP frequency control and FIG. 2b 4f demonstrate the added option of co-programming in frequency along with the many other multi-parameters and functions.

FIG. 4 sec g shows the several parts of the schematic diagram of the HVAC CS circuit in accordance with one embodiment of the present invention wherein interface control circuitry using Opto Programmed techniques allowing varied but direct multiple inputs is illustrated. The multiple and varied features of this single HVAC CS are all simply and concurrently integrated, co-programmed, interacting, controlled and managed throughout this schematic without complex interfaces and digital techniques or software by using mostly Opto Programmed Analog means and features for all the various circuits. As the methods described in FIG. 2a and FIG. 2b demonstrate the vast and varied nature of this CS invention the actual apparatus implementation of FIG. 2b methods is embodied and disclosed in FIG. 4a and primarily shown throughout via section g.

Referring to FIGS. 5a & 5b

FIG. 5a describes and discloses a flow chart and block functional diagram that represents a part or section of the features and functions of the full circuit implementation. Specifically this shows the part of the block diagram in FIG. 2b section 4c and the part of the circuit of FIG. 4a section 4c. The features and functions of the two figures all disclose ways to control various motor functions such as soft start, anti-stall and brownout ride thru both the methods and an apparatus. As described in the FIG. 5a this show logic states and blocks but it is to be understood that the actual implementation will usually be analog/continuous in nature.

FIG. 5b shows the actual plots of the system's response and function as a result of the circuit and OP instructions and control.

Starting with FIG. 5a the incoming AC line voltage 401a goes to 400 the power section to provide sufficient incoming power; to 402 for a control sample and hold function and to 406a for soft start function.

In FIG. 5b the corresponding number shows the plotted resultant data or signal for instance 401a the AC Line shows an example of an AC Line as a function of time wherein the voltage level varies as a function of time.

The AC Line also connects to 402 which is also connected to an OP logic block 404 wherein the AC Line is sampled and compared to a threshold setting. If the AC Line voltage fluctuates below the OP set level it recognize such and will ramp the voltage to the motor up to the voltage level instructed by 407a and 407b.

If the HVAC Control System (CS) is in an initial power up then 406a and 406b will provide the low voltage control signal to the power electronics 400 to boost voltage (and if needed frequency) to the motor to "start it" then throttle back once the motor starts and then 406 goes into a "sleep mode" unless needed and awakened by 405, 407 or 410 to restart or boost.

As long as the motor is operating within it's OP defined boundaries (404, 407a, 409) then it will track whatever external control signals used to instruct 407b. If the motor begins to "sag" below it's programmed idle speed 408 or it's operating voltage level 407b then 405 and/or 410 will "help" the motor to recover to it's proper threshold.

As disclosed and described in these tow FIGS. 5a and 5b all this function and control is embodied and implemented using the simple OP based circuit described in FIG. 4a sec c.

Similar expansion and plots of the circuit functions and features of FIG. 4a could be elaborated for each of the other sections described in section d to section g of FIG. 4a; and for FIG. 2b section 4d and 4g as was done above for section c using FIGS. 5a and 5b; but one skilled in the art should be able to grasp from these two figures coupled with the walk through how all the other sections of the CS's OP circuitry could work in a like manner.

What is claimed is:

1. A closed loop, dynamic, Opto Programmable (OP) HVAC Control and Management System comprising:
   a climate sensor that senses a climate condition and provides input signals relating to said climate condition;
   a fan motor; and
   an opto-programmed HVAC controller that receives input signals from said climate sensor and provides analog control signals based on an input signal received from said climate sensor to continuously vary the speed of said fan motor, said opto-programmed HVAC controller comprising control circuitry that includes an opto-programmed control section that can be programmed with a plurality of non-linear climate profiles and is opto-programmed to continuously vary the speed of said fan motor according to a selected non-linear climate profile from said non-linear climate profiles, said selected climate profile including target speed values for said fan motor, said target speed values including an idle speed representing a minimum speed for said fan motor and other speed values higher than said idle speed value, each target speed value being based on a climate condition, wherein said opto-programmed control section is opto-programmed to continuously vary the speed of said fan motor based on an input signal relating to said climate condition from said climate sensor and said target speed values in said selected climate profile.

2. The system of claim 1, wherein said climate sensor is placed in the discharge air stream of said HVAC system.

3. The system of claim 1, wherein said climate sensor is comprised of a differential circuit bridge.

4. The system of claim 3, wherein each said differential circuit comprises a plurality of opto emitters.

5. The system of claim 1, further comprising a second climate sensor in communication with said HVAC controller to sense a climate parameter of a space.

6. The system of claim 5, wherein said second climate sensor can be a thermostat, a humidity sensor, or a pressure sensor.

7. The system of claim 5, further comprising a control valve and a heat exchanger coil, wherein said HVAC controller can send signals to said control valve to modulate the amount of fluid passing through said heat exchanger in response to signals from said first or said second climate sensor.

8. The system of claim 5, further comprising an outside air damper, wherein said HVAC controller can send signals to open or close said outside air damper based on signals from said first or said second climate sensor.

9. The system of claim 5, further comprising a return air damper, wherein said HVAC controller can send signals to open or close said return air damper based on signals from said first or said second climate sensor.

10. The system of claim 5, further comprising an outside air damper and a return air damper, wherein said HVAC controller can simultaneously send signals to open or close said outside air damper and said return air damper based on signals from said first or said second climate sensor.

11. The system of claim 1, wherein said fan motor includes an encoder mounted on a shaft thereof.

12. The system of claim 1, wherein said opto-programmed controller is capable of receiving a plurality of input signals each related to a sensed environmental condition by a respective sensor and configured to concurrently integrate said plurality of input sianals into at least one output signal.

13. The system of claim 1, wherein said opto-programmed includes a power electronics section which receives said analog output signals from said opto-programmed control section to drive said fan motor.

14. The system of claim 13, wherein said opto-programmed HVAC controller further includes a detect and recover section in communication with said opto-programmed control section to perform motor start up, brown out detect, recovery and ride through, and stall recovery.

15. The system of claim 14, wherein said opto-programmed HVAC controller further includes a section for voltage, frequency, and phase control in communication with said opto-programmed control section.

16. The system of claim 15, wherein said opto-programmed HVAC controller further includes an Input/Output (IO) vector control section that communicates with said opto-programmed control section, filters, integrates and generates IO signals using optical programming, and is capable of receiving a plurality of input signals.

17. The system of claim 1, wherein said opto-programmed HVAC controller further includes in one package a power electronics section which receives output signals from said opto-programmed control section to drive said fan motor device; a detect and recovery section in communication with said opto-programmed control section to perform motor start up, brown out detect, recovery and ride through, and stall recovery; a section for voltage and frequency control in communication with said opto-programmed control section; and an Input/Output (JO) vector control section that communicates with said opto-programmed control section, filters, integrates and generates IO signals using optical programming, and is capable of receiving a plurality of input signals, wherein said opto-programmed control section is opto-programmed to integrate a plurality of input signals and provide one or more output signals from said plurality of input signals.

18. The system of claim 1, wherein each climate profile is curvilinear.

19. The system of claim 1, wherein each climate profile is U-shaped.

20. The system of claim 1, wherein each target speed value in at least one of said climate profiles is based on the thermal capacity of air at a given temperature.

21. An HVAC control and management system, comprising:
- a controllable electromechanical device;
- an opto-programmed controller that generates an analog output control signal for the control of said controllable electromechanical device, said opto-programmed controller comprising at least one optical device; and
- a plurality of sensors each for sensing a respective environmental condition and providing an input signal representing said environmental condition to said opto-programmed controller, wherein said opto-programmed controller receives said input signals from said sensors concurrently and integrates said plurality of input signals into a control signal or control signals, and generates an output signal to drive said controllable electromechanical device.

22. The system of claim 21, wherein said controllable electromechanical device is either a fan motor, or a valve, or damper, or an electric motor or an electric motor powered device.

23. The system of claim 21, wherein said environmental conditions include temperature, or presence of a gas, or humidity, or static pressure, or Co, or $Co_2$, or occupancy.

24. The system of claim 21, wherein said opto-programmed controller includes an opto-programmed control section which receives and integrates said input signals and a power electronics section which receives an output signal from said control section to drive said electromechanical device.

25. The system of claim 24, wherein said opto-programmed controller further includes a detect and recover section, in communication with said opto-programmed control section, and configured to perform motor start up, brown out detect, recovery and ride through, and stall recovery.

26. The system of claim 24, wherein said opto-programmed controller further includes a section for voltage, frequency, and phase control in communication with said opto-programmed control section.

27. The system of claim 26, wherein said opto-programmed controller further includes an Input/Output (IO) vector control section that communicates with said opto-programmed control section, filters, integrates and generates IO signals using optical programming, and is capable of receiving a plurality of input signals.

28. The system of claim 21, wherein said controllable electromechanical device is a fan motor, and at least one of said plurality of sensors is a temperature sensor, said opto-programmed controller is programmed to control a speed of said fan motor based on a non-linear climate profile, said climate profile including target speed values for said fan motor, said target speed values including an idle speed representing a minimum speed for said fan motor and other speed values higher than said idle speed value, each target speed value being based on available thermal capacity of air, wherein said opto-programmed controller is opto-programmed to continuously vary the speed of said fan motor based on an input signal relating to an environmental condition from one of said sensors and said speed values in said climate profile.

29. The system of claim 21, wherein said opto-programmed controller includes in one package an opto-programmed control section which receives and integrates said input signals and a power electronics section which receives an output signal from said control section to drive said electromechanical device; a detect and recover section in communication with said control section to perform motor start up, brown out detect, recovery and ride through, and stall recovery; a section for voltage and frequency control in communication with said control section; and an Input/Output (IO) vector control section that communicates with said control section, filters, integrates and generates IO signals using optical programming, and is capable of receiving a plurality of input signals.

30. The system of claim 29, wherein said controllable electromechanical device is a fan motor, and at least one of said plurality of sensors is a temperature sensor, and said opto-programmed control section is programmed to control a speed of said fan motor based on a non-linear climate profile, said climate profile, including target speed values for said fan motor, said target speed values including an idle speed representing a minimum speed for said fan motor and other speed values higher than said idle speed value, each target speed value being based on available thermal capacity of air, wherein said opto-programmed control section is opto-programmed to continuously vary the speed of said fan motor based on an input signal relating to said climate condition from one of said sensors and said speed values in said climate profile.

31. The system of claim 21, wherein each said sensor is comprised of a differential bridge.

32. The system of claim 31, wherein each said sensor comprises a plurality of opto emitters.

\* \* \* \* \*